US010482312B2

(12) United States Patent
Pan

(10) Patent No.: US 10,482,312 B2
(45) Date of Patent: Nov. 19, 2019

(54) FINGER SCANNER, AND METHOD OF SCANNING A FINGER USING THE FINGER SCANNER

(71) Applicant: Changbang Pan, The Hague (NL)

(72) Inventor: Changbang Pan, The Hague (NL)

( * ) Notice: Subject to any disclaimer, the term of this patent is extended or adjusted under 35 U.S.C. 154(b) by 112 days.

(21) Appl. No.: 15/556,057

(22) PCT Filed: Mar. 10, 2016

(86) PCT No.: PCT/NL2016/050171
§ 371 (c)(1),
(2) Date: Sep. 6, 2017

(87) PCT Pub. No.: WO2016/144174
PCT Pub. Date: Sep. 15, 2016

(65) Prior Publication Data
US 2018/0046838 A1     Feb. 15, 2018

(30) Foreign Application Priority Data
Mar. 12, 2015 (NL) .................................... 2014444

(51) Int. Cl.
*G06K 9/00* (2006.01)
(52) U.S. Cl.
CPC ......... *G06K 9/0012* (2013.01); *G06K 9/0002* (2013.01); *G06K 9/00026* (2013.01); *G06K 9/00087* (2013.01)
(58) Field of Classification Search
CPC ............. G06K 9/0002; G06K 9/00026; G06K 9/00087; G06K 9/0012
See application file for complete search history.

(56) References Cited

U.S. PATENT DOCUMENTS 8,073,204 B2 * 12/2011 Kramer .............. G06K 9/00013
250/208.1
2004/0155752 A1    8/2004 Radke
(Continued)

FOREIGN PATENT DOCUMENTS

EP          2383694 A1    11/2011

OTHER PUBLICATIONS

International Search Report for International Application No. PCT/NL2016/050171 dated Jul. 7, 2016.
(Continued)

*Primary Examiner* — Bhavesh M Mehta
*Assistant Examiner* — Ian L Lemieux
(74) *Attorney, Agent, or Firm* — Thomas|Horstemeyer, LLP

(57) ABSTRACT

A finger scanner comprises a first member and a second member. The first member has a first contact surface configured to contact a first part of a finger, and the second member has a second contact surface adjacent to the first member and configured to contact a second part of the finger adjacent to the first part of the finger. The first contact surface has a first height and the second contact surface has a second height, with a fixed or variable height difference between the first height and the second height. The finger scanner further comprises a first fingerprint sensor associated with the first contact surface, and a second fingerprint sensor associated with the second contact surface.

26 Claims, 5 Drawing Sheets

(56) References Cited

U.S. PATENT DOCUMENTS

| | | | |
|---|---|---|---|
| 2007/0208241 A1* | 9/2007 | Drucker | A61B 5/00 |
| | | | 600/323 |
| 2008/0075339 A1 | 3/2008 | Haddad | |
| 2008/0166028 A1 | 7/2008 | Turek et al. | |
| 2008/0238878 A1 | 10/2008 | Wang | |
| 2010/0067747 A1 | 3/2010 | Perruchot et al. | |
| 2011/0032206 A1* | 2/2011 | Kitamura | G06F 1/169 |
| | | | 345/173 |
| 2012/0218231 A1* | 8/2012 | Slaby | G06F 3/0418 |
| | | | 345/178 |
| 2013/0120262 A1* | 5/2013 | Piot | G06F 3/03541 |
| | | | 345/163 |
| 2015/0310252 A1* | 10/2015 | Aoki | G06K 9/00033 |
| | | | 382/115 |
| 2015/0334859 A1* | 11/2015 | Lee | H05K 5/0247 |
| | | | 361/749 |
| 2017/0161577 A1* | 6/2017 | Lee | G06F 21/32 |

OTHER PUBLICATIONS

Search Report for NL Application No. 2014444 completed Nov. 20, 2015.

* cited by examiner

FINGER SCANNER, AND METHOD OF SCANNING A FINGER USING THE FINGER SCANNER

CROSS-REFERENCE TO RELATED APPLICATION

This application is the National Stage of International Application No. PCT/NL2016/050171, filed 10 Mar. 2016, which claims the benefit of and priority to NL Application No. 2014444, having the title "Finger Scanner, and Method of Scanning a Finger Using the Finger Scanner," filed on 12 Mar. 2015, the entire disclosures of which are incorporated by reference in their entireties as if fully set forth herein.

FIELD OF THE INVENTION

The invention relates to the field of scanning a finger, and more specifically to the field of scanning a surface of a finger comprising a fingerprint. In particular, the invention relates to a finger scanner, and a method of scanning a finger using the finger scanner.

BACKGROUND OF THE INVENTION

Fingerprints of individual persons have been proven to be virtually unique to the corresponding persons, and therefore are used widely in identification and access applications, where a person is to be identified and/or authenticated for the application. Several fingerprint scanners are known in the prior art, which use different types of scanning technologies. High quality fingerprint scans may be obtained through optical or electronic scans, and such scans may be matched to authentic fingerprint data stored previously. The scans may be combined with advanced computer algorithms or other scanning or detecting methods.

Capturing a pattern of a fingerprint by scanning a finger may be abused by presenting a fake fingerprint to a finger scanner in an attempt to spoof a fingerprint-based identification or authenticating system. For example, a facsimile of a fingerprint on paper or film, possible applied with a liquid, may be used to fake a fingerprint. As another example, a mold of a fingertip made of plastic, glass, metal, rubber, adhesive, silicone, gelatin, etc., in particular as a thin layer on the surface of a real finger, may be used to fake a fingerprint.

A need remains to further increase security of finger scanning.

SUMMARY OF THE INVENTION

It would be desirable to provide a finger sensor providing a high security against fingerprint forgery. It would also be desirable to provide a method of scanning a finger with a high security against fingerprint forgery.

To better address one or more of these concerns, in a first aspect of the invention a finger scanner is provided, comprising a first member and a second member. The first member has a first contact surface configured to contact a first part of a finger, and the second member has a second contact surface adjacent to the first member and configured to contact a second part of the finger adjacent to the first part of the finger. The first contact surface has a first height and the second contact surface has a second height, wherein the first height and the second height have a fixed or variable height difference. A first fingerprint sensor is associated with the first contact surface, and a second fingerprint sensor is associated with the second contact surface.

Herein, a first member and a second member each represent a structure presenting a contact surface.

In exemplary embodiments, the contact surface is generally flat or curved. The first contact surface of the first member, in particular the part thereof closest to the second contact surface of the second member, is generally parallel to the second contact surface, in particular the part thereof closest to the first contact surface.

A first height of the first contact surface can be measured along an imaginary line at right angles to a representative plane of the first contact surface. Similarly, a second height of the second contact surface can be measured along an imaginary line at right angles to a representative plane of the second contact surface. Said lines may coincide. The first contact surface having a first height different from a second height of the second contact surface means, in equivalent words, that an edge of the first contact surface is at a different height than an adjacent edge of the second contact surface. In some embodiments, the term "different" or "height difference" may indicate that the first contact surface, at least at its edge adjacent to an edge of the second contact surface, is above the (edge of the) second contact surface. In other embodiments the term "different" or "height difference" may indicate that the first contact surface, at least at its edge adjacent to an edge of the second contact surface, is below the (edge of the) second contact surface.

In the finger scanner of the present invention, an output of the first fingerprint sensor is combined with an output of the second fingerprint sensor to provide an image of a first contact surface and a second contact surface of a skin of the finger. With the first member and second member as defined above, a technical effect of deformation of the skin can be obtained when the finger is pressed simultaneously on the first contact surface and the second contact surface, by the pressure exerted on the finger contact surface by the first member differing from the pressure exerted on the finger contact surface by the second member. In particular, in a transitional region from the first contact surface to the second contact surface, when pressing the finger on the finger scanner, the skin will locally be under different degrees of tension, and will thereby deform locally. The image provided by combining the outputs of the first and second fingerprint sensor will therefore markedly differ from an image taken of the same total finger skin contact surface when the local tension is absent, and therefore provides information on the local behavior of the particular skin under the influence of local tension. This behavior is representative for skin material, in particular skin material of a particular person.

In case a counterfeit material, for example a relatively soft material such as a silicon or gel based material, or a relatively hard material like a plastic, glass or metal material, instead of skin, would be presented to the finger scanner of the present invention, a deformation of the counterfeit material would be markedly different, i.e. higher or lower, or locally higher or lower, under the influence of the local tension in a transitional region from the first member to the second member. Thus, even if the counterfeit material would have been provided with a pattern accurately imitating a (non-deformed) fingerprint pattern of a finger to be imitated, then presenting the counterfeit material to the finger scanner of the present invention would provide a scan result markedly different from a scan result of the skin of the original finger. Such forged scan result can be detected by comparing it to a previously stored authentic scan result of the original finger, and measures can be taken to reject the forged scan result, and to take appropriate further actions.

In an embodiment of the finger scanner, the first member is fixed to the second member, in other words, the first member is not movable relative to the second member. Thus, the first contact surface of the first member takes a stationary position relative to the second contact surface of the second member. As an example, the first contact surface may be generally above the second contact surface, indicating that a finger approaching the finger scanner will touch the first contact surface before touching the second surface. As another example, the first contact surface may be generally below the second contact surface, indicating that a finger approaching the finger scanner will touch the second contact surface before touching the first contact surface. The height difference between the first contact surface and the second contact surface, in particular at adjacent edges thereof, creates a (local) deformation of the fingerprint.

In another embodiment of the finger scanner, the first member is movable relative to the second member between a first position in which the first contact surface is above the second contact surface, and a second position in which the first contact surface has been displaced relative to the first position. In the embodiment, the finger scanner further comprises a biasing assembly configured to exert a force on the first part of the finger through the first contact surface of the first member during displacement of the first member from the first position to the second position thereof, the force being directed from the second position towards the first position thereof.

In use of the finger scanner of this embodiment, the first member is moved by a finger from the first position of the first member towards the second position thereof, against a force exerted on the first member by the biasing assembly. In reaction, a pressure is exerted on the finger across a contact surface which equals the first contact surface of the first member. This pressure will be higher than the pressure exerted on the finger across a contact surface which equals the second contact surface of the second member, at least during displacement of the first member from the first position to the second position thereof, and possibly, but not necessarily, also in the second position of the first member. As a result of this pressure difference, the finger skin stretches or deforms, in particular in the region near the edge of the first contact surface. In other words, the finger skin deforms by the finger pressing the first member from its first position towards its second position. Again, an effect of deformation of the skin is reached in such embodiment.

In the second position of the first member, where the first contact surface may be above the second contact surface, or may be in aligned with the second contact surface, the finger is not only in contact with the first contact surface of the first member of the finger scanner, but also with the second contact surface of the second member of the finger scanner. The biasing assembly can be configured such that in the second position of the first member, a predetermined pressure is exerted on the finger across a contact surface which equals the first contact surface of the first member. The pressure exerted on a contact surface which equals the second contact surface of the second member will be lower.

Upon release of the finger from the first member, the biasing assembly causes the first member to return to its first position.

In an embodiment of the finger scanner having a first member movable to the second member, the biasing assembly comprises a spring member, such as a compression spring member. The first member, during displacement of the first member from the first position to the second position thereof, loads the spring member, which exerts a force on the first part of the finger through the first contact surface of the first member.

In an embodiment of the finger scanner having the first member movable to the second member, the biasing assembly comprises a stop member limiting the displacement of the first member from the first position to the second position thereof. In particular, the stop member may define the second position.

In an embodiment of the finger scanner having the first member movable to the second member, the biasing assembly is configured to substantially lower the force when the first member is in the second position thereof. Here, lowering the force exerted by the biasing assembly may involve the biasing assembly exerting no force on the first part of the finger through the first contact surface of the first member. Lowering the force, after first having applied a higher force, allows the deformed skin to gradually, in the course of time, take a less deformed shape, or even its original shape if the force is lowered to zero, while the first fingerprint sensor and the second fingerprint sensor are activated. Thus, fingerprint data can be acquired over time showing the deformation of the finger skin over time. Of course, it is also possible to acquire fingerprint data only immediately after the force is lowered. Lowering the force will provide tactile feedback to the person whose finger is scanned to let the finger rest on the scanner.

In an embodiment of the finger scanner having the first member movable to the second member, the biasing assembly comprises a bladder made from a flexible resilient material, an interior volume of the bladder being in fluid communication with the an exterior of the bladder through an opening having a predetermined flow resistance. In the first position of the first member, the bladder may be filled with air having the same pressure as the air outside of the bladder. When moving the first member relative to the second member from the first position to the second position of the first member, the bladder is compressed, whereby the pressure in the bladder rises. Air at the interior of the bladder is pressed out through the opening of the bladder during the movement of the first member from the first position to the second position thereof. By designing the opening to have a predetermined flow resistance, the bladder exerts a force on the first part of the finger through the first contact surface of the first member during displacement of the first member from the first position to the second position thereof. Sometime after the first member has reached the second position, pressure inside and outside the bladder will equalize by air flowing out of the bladder through its opening. As a result, the force lowers.

Upon release of the finger from the first member, the resiliency of the bladder causes air to flow into the bladder through the opening, whereby the bladder tends to take its original shape to bring the first member back into its first position.

In an embodiment of the finger scanner having the first member movable to the second member, the biasing assembly comprises a first magnet part connected to the first member, and a second magnet part connected to the second member, at least one of the first magnet part and the second magnet part being energizable and de-energizable to hold and release the first member in position relative to the second member, respectively.

The first magnet part and the second magnet part are configured to exert an attracting force between each other, when at least one of the first magnet part and the second magnet part is energized. This attracting force holds the first member in position relative to the second member under the prevailing other forces acting thereon, such as a force exerted by other parts of the biasing assembly. When none of the first magnet part and the second magnet part is energized, no attracting force is exerted between the first magnet part and the second magnet part, and the first member can take a position relative to the second member depending on the prevailing other forces acting thereon. An energizable magnet part may comprise an electromagnet. The electromagnet being one of the first magnet part and the second magnet part may interact with the other one of the first magnet part and the second magnet part being made from a magnetizable material, or being a permanent magnet.

Upon energizing one of the first magnet part and the second magnet part, the force exerted by the biasing assembly on the first part of the finger through the first contact surface of the first member may be lowered to a great extent, or may become zero.

In an embodiment of the finger scanner having the first member movable to the second member, the biasing assembly comprises a ball point pen type mechanism holding the first member in at least one of the first position or the second position thereof. The ball point pen type mechanism has two stable positions in which no force is exerted on the first part of the finger through the first contact surface of the first member, whereas during displacement of the first member, such as from the first position to the second position thereof, the ball point pen type mechanism does exert a force on the first part of the finger through the first contact surface of the first member.

In an embodiment, the finger scanner further comprises a force sensor for measuring a force exerted on at least one of the first contact surface and the second contact surface.

When the force sensor is part of the finger scanner having a first contact surface of a first member having a first height having a fixed height difference with a second height of a second contact surface of a second member, then the force sensor may ensure that each finger scan, using outputs from the first fingerprint sensor and the second fingerprint sensor, is taken at a same or similar force exerted by the finger on the finger scanner during scanning. Accordingly, scan results of different scans are taken under comparable circumstances, and deformations of a same skin during different scans will be similar, thus improving the reproducibility of the scan for the same finger at different scans, and thus improving the reliability and security of the finger scanner.

In an embodiment, the finger scanner further comprises a position detector for detecting a position of the first member.

When the position sensor is part of the finger scanner having a first contact surface of a first member having a first height having a variable height difference with a second height of a second contact surface of a second member, then the position detector may ensure that each finger scan, using outputs from the first fingerprint sensor and the second fingerprint sensor, is taken at a same or similar position (i.e. first height) of the first member. Accordingly, scan results of different scans are taken under comparable circumstances, and deformations of a same skin during different scans will be similar, thus improving the reproducibility of the scan for the same finger at different scans, and thus improving the reliability and security of the finger scanner.

In an embodiment of the finger scanner, at least one of the first contact surface and the second contact surface is provided with a skin resistance sensor.

The skin resistance sensor aids in discriminating between a real finger contacting the finger scanner, and another element imitating a fingerprint contacting the finger scanner. The real finger may provide a markedly different skin resistance value measured by the skin resistance sensor than the other element, indicating immediately that a fake fingerprint is likely to be presented.

In order to obtain a reproducible and measurable deformation of the finger skin, in an embodiment of the finger scanner, a distance or gap between an edge of the first contact surface and an adjacent edge of the second contact surface is at least 0.1 mm, in particular at least 0.5 mm, more in particular at least 1 mm. It is noted that the distance can be essentially measured in a height direction, when the first contact surface is above or below the second contact surface, or can be essentially measured parallel to the first and second contact surface when they are aligned.

A deformation of the skin occurs near adjacent edges of the first and second contact surfaces of the first and second members, respectively. In an embodiment of the finger scanner, the second contact surface at least partially surrounds the first member. The greater the degree of surrounding, the greater the area of deformation of the finger skin, and the better the reproducibility, reliability and security of the scanning by the finger scanner will be.

In an embodiment of the finger scanner, at least one of the first contact surface and the second contact surface is shaped concavely, to guide the finger of the user as much as possible to a predetermined scanning position, whereby deformations of the skin occur at or near the same skin positions in different scans over time.

In an embodiment of the finger scanner having the first member fixed or movable relative to the second member, a processing device may be provided, the processing device being configured to: receive an output from the force sensor; compare the force measured by the force sensor to a reference force; and, if the measured force corresponds to the reference force, then activate the first fingerprint sensor and the second fingerprint sensor to provide respective outputs. The output from the force sensor represents a force measured by the force sensor. The outputs from the first fingerprint sensor and the second fingerprint sensor represent respective fingerprint data. The processing device may be a signal processing device and/or a data processing device.

In an embodiment of the finger scanner having the first member movable relative to the second member, a processing device may be provided, the processing device being configured to: receive an output from the position detector; determine whether the position detected by the position detector corresponds to the second position of the first member; and, if the detected position corresponds to the second position, then activate the first fingerprint sensor and the second fingerprint sensor to provide respective outputs. The output from the force sensor represents a force measured by the force sensor. The outputs from the first fingerprint sensor and the second fingerprint sensor represent respective fingerprint data. The processing device may be a signal processing device and/or a data processing device.

In an embodiment of the finger scanner, the processing device further is configured to: receive outputs from the first fingerprint sensor and the second fingerprint sensor; and process the outputs to determine finger data representative of the finger surface in contact with the first contact surface and the second contact surface.

In a further embodiment of the finger scanner, the processing device further is configured to: compare the finger data with previously stored authentic finger data; and provide a signal indicating a degree of conformity between the finger data and the previously stored authentic finger data.

In an exemplary embodiment of the finger scanner, the first fingerprint sensor and the second fingerprint sensor each comprise a sensor selected from a group of sensors comprising an optical sensor, an ultrasonic sensor, and a capacitive sensor.

The finger scanner may be used for identification or access, e.g. digital or physical access. In such a case, the finger scanner may be part of an identification device or access control device.

In a second aspect of the invention, a method of scanning a finger is provided.

When a finger scanner having a first member fixed or movable relative to a second member is used, the method comprises the steps of: contacting the first contact surface and the second contact surface by the finger; pressing by the finger on the first contact surface and the second contact surface until a force measured by the force sensor corresponds to a reference force; and activating the first fingerprint sensor and the second fingerprint sensor.

When a finger scanner having a first member movable relative to a second member is used, the method comprises the steps of: contacting a first part of the finger with the first contact surface of the first member in the first position thereof; pressing by the finger on the first member to move the first contact surface towards the second contact surface until the first member is in the second position thereof; and activating the first fingerprint sensor and the second fingerprint sensor.

In an embodiment, the method further comprises: receiving outputs from the first fingerprint sensor and the second fingerprint sensor; and processing the outputs to determine finger data representative of the finger surface in contact with the first contact surface and the second contact surface.

In a further embodiment, the method further comprises: comparing the finger data with previously stored authentic finger data; and providing a signal indicating a degree of conformity between the finger data and the previously stored authentic finger data.

These and other aspects of the invention will be more readily appreciated as the same becomes better understood by reference to the following detailed description and considered in connection with the accompanying drawings in which like reference symbols designate like parts.

BRIEF DESCRIPTION OF THE DRAWINGS

FIG. 1b depicts a top view of the embodiment of the finger scanner of FIG. 1a.

DETAILED DESCRIPTION OF EMBODIMENTS

Figure 1A:
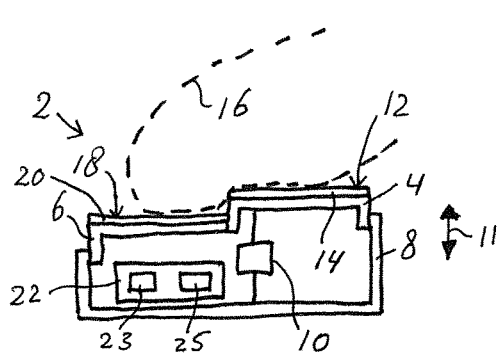
FIG. 1a depicts a cross-sectional view, as seen in plane A of FIG. 1b, of a schematically represented first embodiment of a finger scanner according to the present invention.
Figure 1B:
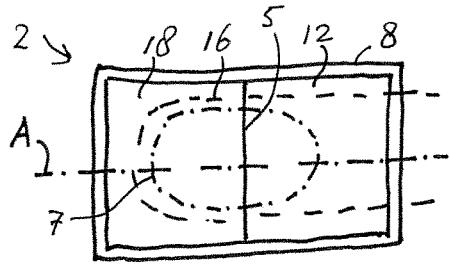

FIGS. 1a and 1b show a cross-sectional view and a top view, respectively, of a finger scanner 2. The finger scanner 2 comprises a first member 4 fixed to a second member 6. A base 8 of the finger scanner 2 is connected to the first member 4 through a force sensor 10, such as a load cell. The assembly of the first member 4 and the second member 6 may be movable in directions of double arrow 11 relative to the base 8 to enable the force sensor 10 to sense a force exerted on the first member 4 and/or the second member 6 in the direction of base 8. Alternatively, the first member 4, the second member 6 and the base 8 may be fixed to each other, and made of a flexible material to be deformable for the force sensor 10 to sense a force exerted on the first member 4 and/or the second member 6 in the direction of base 8, wherein the flexible material is resilient to take its original shape when said force is removed.

The first member 4 comprises a first contact surface 12 having a first fingerprint sensor 14 associated with it. In FIG. 1a, the first fingerprint sensor 14 is situated at or near the first contact surface 12. The first fingerprint sensor 14 is configured to scan a first part (of a surface) of a finger 16 (indicated by a dashed line) contacting the first contact surface 12.

The second member 6 comprises a second contact surface 18 having a second fingerprint sensor 20 associated with it.

In FIG. 1a, the second fingerprint sensor 20 is situated at or near the second contact surface 18. The second fingerprint sensor 20 is configured to scan a second part (of a surface) of the finger 16 (indicated by a dashed line) contacting the second contact surface 12.

The first and second contact surfaces 12, 18 are shown to be flat. In other embodiments, either one or both of the first and second contact surfaces 12, 18 may be curved, in particular concave, e.g. bent (slightly) upwards at their edges, possibly with the exception of their adjacent edges. The first contact surface 12 has a first height different from a second height of the second contact surface 18, e.g. when considered relative to the base 8. The first height and the second height have a fixed height difference. In the finger scanner 2, the first contact surface 12 is above the second contact surface 18. In other embodiments, the first contact surface 12 may be below the second contact surface 18.

The finger scanner 2 may comprise circuitry 22 for operating the first and second fingerprint sensors 14, 20 and the force sensor 10, for communication, including Near Field Communication, NFC, with another apparatus or network, etc. The circuitry 22 may comprise a power source such as a battery, and may comprise a processing device 23 for data and/or signals, and a memory 25.

Figure 2A:
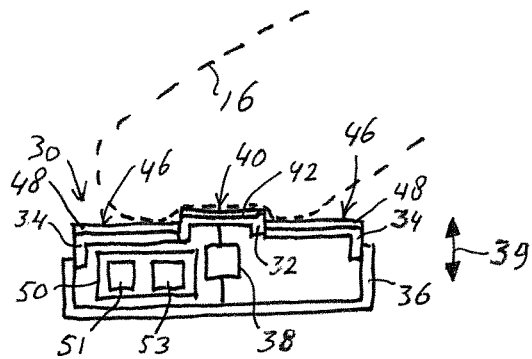
FIG. 2a depicts a cross-sectional view, as seen in plane B of FIG. 2b, of a schematically represented second embodiment of a finger scanner according to the present invention.
Figure 2B:
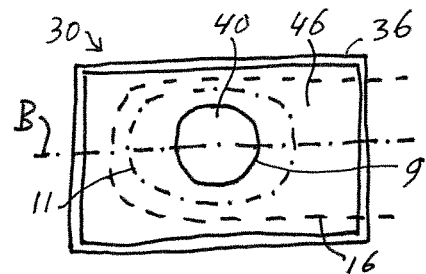
FIG. 2b depicts a top view of the embodiment of the finger scanner of FIGS. 2a, 3a, 3b, 3c, 3d, 3e, 3f, 3g and 3h.

FIGS. 2a and 2b show a cross-sectional view and a top view, respectively, of a finger scanner 30. The finger scanner 30 comprises a first member 32 fixed to a second member 34. A base 36 of the finger scanner 30 is connected to the first member 32 through a force sensor 38, such as a load cell. The assembly of the first member 32 and the second member 34 may be movable in directions of double arrow 39 relative to the base 36 to enable the force sensor 38 to sense a force exerted on the first member 32 and/or the second member 34 in the direction of base 36. Alternatively, the first member 32, the second member 34 and the base 36 may be fixed to each other, and made of a flexible material to be deformable for the force sensor 10 to sense a force exerted on the first member 32 and/or the second member 34 in the direction of base 36, wherein the flexible material is resilient to take its original shape when said force is removed.

The first member 32 comprises a first contact surface 40 having a first fingerprint sensor 42 associated with it. In FIG. 2a, the first fingerprint sensor 42 is situated at or near the first contact surface 40. The first fingerprint sensor 42 is configured to scan a first part (of a surface) of a finger 16 (indicated by a dashed line) contacting the first contact surface 40.

The second member 34 comprises a second contact surface 46 having a second fingerprint sensor 48 associated with it. In FIG. 2a, the second fingerprint sensor 48 is situated at or near the second contact surface 46. The second fingerprint sensor 48 is configured to scan a second part (of a surface) of the finger 16 (indicated by a dashed line) contacting the second contact surface 40.

The first and second contact surfaces 40, 46 are shown to be flat. In other embodiments, either one or both of the first and second contact surfaces 40, 46 may be curved, in particular concave, e.g. bent (slightly) upwards at their edges, possibly with the exception of their adjacent edges. The first contact surface 40 has a first height different from a second height of the second contact surface 46, e.g. when considered relative to the base 36. The first height and the second height have a fixed height difference. In the finger scanner 30, the first contact surface 40 is above the second contact surface 46. In other embodiments, the first contact surface 40 may be below the second contact surface 46.

The finger scanner 30 may comprise circuitry 50 for operating the first and second fingerprint sensors 42, 48 and the force sensor 38, for communication, including Near Field Communication, NFC, with another apparatus or network, etc. The circuitry 50 may comprise a power source such as a battery, and may comprise a processing device 51 for data and/or signals, and a memory 53.

Figure 3A:
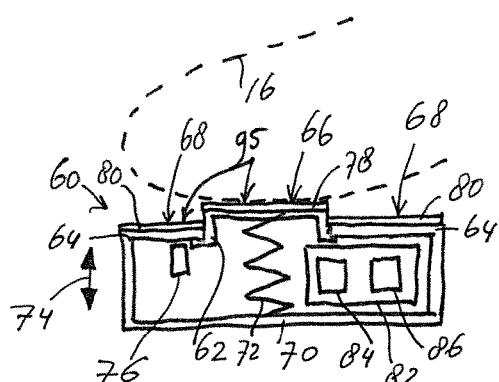
FIG. 3a depicts a cross-sectional view of a schematically represented third embodiment of a finger scanner according to the present invention, showing a first member in a first position thereof.
Figure 3B:
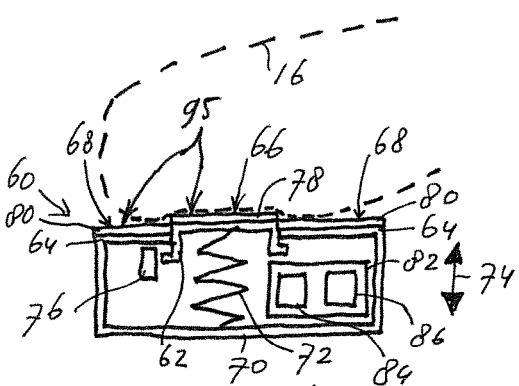
FIG. 3b depicts a cross-sectional view of the embodiment of FIG. 3a, showing the first member in a second position thereof.

FIGS. 3a and 3b show cross-sectional views of a finger scanner 60, which may have a top view similar to FIG. 2b. The finger scanner 60 comprises a first member 62 which is movable relative to a second member 64 between a first position, as shown in FIG. 3a, in which a first contact surface 66 of the first member 62 is above a second contact surface 68 of the second member 64, and a second position, as shown in FIG. 3b, in which the first contact surface 66 has been displaced relative to the first position, in particular towards the second contact surface 68. Between a base 70 of finger scanner 60 and the first member 62, a biasing member 72 is provided, the biasing member 72 being embodied here as a compression spring configured to exert a force on a first part of a finger through the first contact surface 66 of the first member 62 directed from the second position towards the first position thereof.

The first member 62 is movable, as indicated by double arrow 74, from its first position in a direction of its second position by pressing the first member 62 towards the second member 64 against the force of the biasing member 72. When released, the first member 62 moves back to its first position through the action of the biasing member 72.

The finger scanner 60 further comprises a position detector 76 for detecting a position of the first member 62.

The first member 62, with the first contact surface 66, has a first fingerprint sensor 78 associated with it. In FIGS. 3a, 3b, the first fingerprint sensor 78 is situated at or near the first contact surface 66. The first fingerprint sensor 78 is configured to scan a first part (of a surface) of a finger 16 (indicated by a dashed line) contacting the first contact surface 66.

The second member 64, with the second contact surface 68, has a second fingerprint sensor 80 associated with it. In FIGS. 3a, 3b, the second fingerprint sensor 80 is situated at or near the second contact surface 68. The second fingerprint sensor 80 is configured to scan a second part (of a surface) of the finger 16 (indicated by a dashed line) contacting the second contact surface 68.

The first and second contact surfaces 66, 68 are shown to be flat. In other embodiments, either one or both of the first and second contact surfaces 66, 68 may be curved, in particular concave, e.g. bent (slightly) upwards at their edges, possibly with the exception of their adjacent edges. The first contact surface 66 has a first height different from a second height of the second contact surface 68, e.g. when considered relative to the base 70. The first height and the second height have a variable height difference. In the finger scanner 60, the first contact surface 66 is above the second contact surface 68, both in the first position of the first member 62 and in the second position of the first member 62. However, in the second position the first contact surface 66 may also be aligned with the second contact surface 68.

The finger scanner 60 may comprise circuitry 82 for operating the first and second fingerprint sensors 78, 80 and the detector 76, for communication, including Near Field Communication, NFC, with another apparatus or network, etc. The circuitry 82 may comprise a power source such as a battery, and may comprise a processing device 84 for signals and/or data, and a memory 86.

Figure 3C:
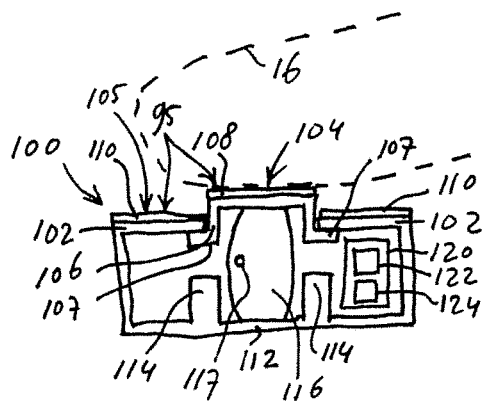
FIG. 3c depicts a cross-sectional view of a schematically represented fourth embodiment of a finger scanner according to the present invention, showing a first member in a first position thereof.
Figure 3D:
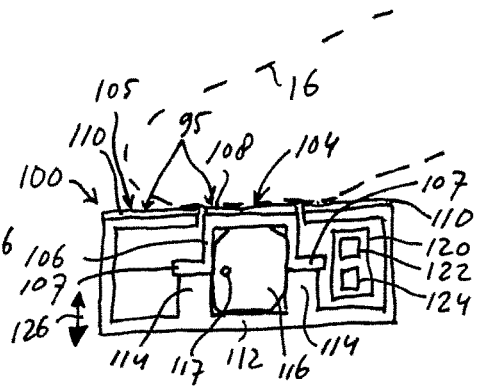
FIG. 3d depicts a cross-sectional view of the embodiment of FIG. 3c, showing the first member in a second position thereof.

FIGS. 3c and 3d show cross-sectional views of a finger scanner 100, which may have a top view similar to FIG. 2b. The finger scanner 100 comprises a first member 106 which is movable relative to a second member 102 between a first position, as shown in FIG. 3c, in which a first contact surface 104 of the first member 106 is above a second contact surface 105 of the second member 102, and a second position, as shown in FIG. 3d, in which the first contact surface 104 has been displaced relative to the first position, in particular towards the second contact surface 105. Between a base 112 of finger scanner 100 and the first member 106, a biasing member is provided, the biasing member being embodied here as a bladder 116 configured to exert a force on a first part of a finger 16 through the first contact surface 104 of the first member 106 directed from the second position towards the first position thereof.

The bladder 116 is made from a flexible resilient material. An interior volume of the bladder 116 is filled with air, and is in fluid communication with an exterior of the bladder 116 through an opening 117 having a predetermined flow resistance. In the first position of the first member 106, air pressure inside the bladder 116 may be equal to air pressure outside the bladder 116 by virtue of the opening 117. By selection of an appropriate flow resistance of the opening 117, upon compression of the bladder 116, the air pressure inside the bladder 116 increases faster than air may escape from the bladder 116 through opening 117 to equalize the interior and exterior pressure. As a result, the bladder exerts a force on a first part of a finger 16 (indicated by a dashed line) through the first contact surface 104 of the first member 106.

The first member 106 is movable, as indicated by double arrow 126, from its first position in a direction of its second position by pressing the first member 106 towards the second member 102 against the force of the bladder 116, resulting from an increasing air pressure generated by compressing air inside the bladder 116.

The first member 106 can be pressed down until a lower collar 107 thereof contacts a stop member 114 provided on the base 112. In this second position of the first member 106, the first contact surface 104 is aligned with the second contact surface 105. In other embodiments, the first contact surface 104 may be above or below the second contact surface 105.

When the first member 106 is kept in the second position by the finger pressing on the first member 106, the interior pressure of the bladder 116 equalizes with the external pressure through the opening 117, whereby the force exerted by the bladder 116 on the first part of the finger 16 through its first contact surface 104 of the first member 106 diminishes. When released, the first member 106 moves back to its first position through the action of the resilient bladder 116 taking its original shape as in the first position of the first member 106.

The first member 106, with the first contact surface 104, has a first fingerprint sensor 108 associated with it. In FIGS. 3c, 3d, the first fingerprint sensor 108 is situated at or near the first contact surface 104. The first fingerprint sensor 108 is configured to scan a first part (of a surface) of the finger 16 contacting the first contact surface 104.

The second member 102, with the second contact surface 105, has a second fingerprint sensor 110 associated with it. In FIGS. 3c, 3d, the second fingerprint sensor 110 is situated at or near the second contact surface 105. The second fingerprint sensor 110 is configured to scan a second part (of a surface) of the finger 16 contacting the second contact surface 105.

The first and second contact surfaces 104, 105 are shown to be flat. In other embodiments, either one or both of the first and second contact surfaces 104, 105 may be curved, in particular concave, e.g. bent (slightly) upwards at their edges, possibly with the exception of their adjacent edges. The first contact surface 104 may have a first height different from a second height of the second contact surface 105, e.g. when considered relative to the base 112. The first height and the second height have a variable height difference. In the finger scanner 100, the first contact surface 104 may be above the second contact surface 105 in the first position of the first member 106 and in the second position of the first member 106. However, in the second position the first contact surface 104 may also be aligned with the second contact surface 105.

The finger scanner 100 may comprise circuitry 120 for operating the first and second fingerprint sensors 108, 110, for communication, including Near Field Communication, NFC, with another apparatus or network, etc. The circuitry 120 may comprise a power source such as a battery, and may comprise a processing device 122 for signals and/or data, and a memory 124.

Figure 3E:
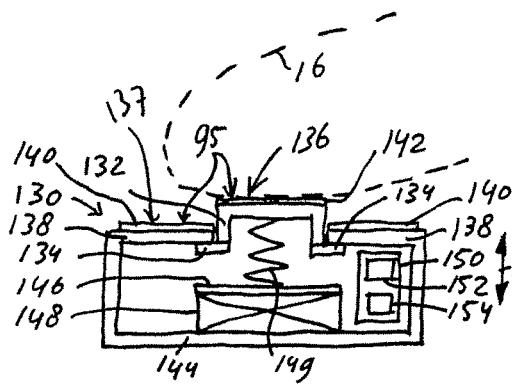
FIG. 3e depicts a cross-sectional view of a schematically represented fifth embodiment of a finger scanner according to the present invention, showing a first member in a first position thereof.
Figure 3F:
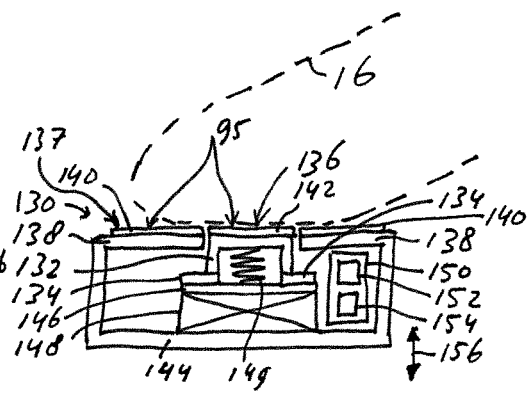
FIG. 3f depicts a cross-sectional view of the embodiment of FIG. 3e, showing the first member in a second position thereof.

FIGS. 3e and 3f show cross-sectional views of a finger scanner 130, which may have a top view similar to FIG. 2b. The finger scanner 130 comprises a first member 132 which is movable relative to a second member 138 between a first position, as shown in FIG. 3e, in which a first contact surface 136 of the first member 132 is above a second contact surface 137 of the second member 138, and a second position, as shown in FIG. 3f, in which the first contact surface 136 has been displaced relative to the first position, in particular towards the second contact surface 137. Between a base 144 of finger scanner 130 and the first member 132, a biasing member is provided, the biasing member being embodied here as a compression spring 149 configured to exert a force on a first part of a finger 16 through the first contact surface 136 of the first member 132 directed from the second position towards the first position thereof. The compression spring 149 is made from a flexible resilient material, such as metal or plastic.

The first member 132 is movable, as indicated by double arrow 156, from its first position in a direction of its second position by pressing the first member 132 towards the second member 138 against the force of the compression spring 149.

The first member 132 can be pressed down until a lower part or parts 134 thereof contacts/contact a stop member 146 provided on an electric coil 148, which in turn is provided on the base 144. In this second position of the first member 132, the first contact surface 136 is aligned with the second contact surface 137. In other embodiments, the first contact surface 136 may be above or below the second contact surface 137.

The lower part or parts 134 may be made from a magnetizable or permanently magnetized material. A polarity of a magnetic field generated by the electric coil 148, when energized, is such as to attract the lower part or parts 134. When energized, the electric coil 148 may hold the first member 132 in its second position, whereby the force exerted by the compression spring 149 on the first part of the finger 16 through its first contact surface 136 of the first member 132 is compensated and reduced to zero. When the electric coil 148 is de-energized, the first member 132 moves back to its first position through the action of the compression spring 149.

The stop member 146 may be made from an electrically conducting material. Lower parts 134 of the first member 132 may also be electrically conducting, and form contact parts of an electrical circuit to detect an electrical connection or disconnection between the parts 134. Such electrical connection may be made by the stop member 146 in the second position of the first member 132. Upon detection of the electrical connection between the parts 134, the electric coil 148 may be energized for a predetermined time. Thus, the assembly of the parts 134 and the stop member 146 may form an electrical switch.

The first member 132, with the first contact surface 136, has a first fingerprint sensor 142 associated with it. In FIGS. 3e, 3f, the first fingerprint sensor 142 is situated at or near the first contact surface 136. The first fingerprint sensor 142 is configured to scan a first part (of a surface) of the finger 16 contacting the first contact surface 136.

The second member 138, with the second contact surface 137, has a second fingerprint sensor 140 associated with it. In FIGS. 3e, 3f, the second fingerprint sensor 140 is situated at or near the second contact surface 137. The second fingerprint sensor 140 is configured to scan a second part (of a surface) of the finger 16 contacting the second contact surface 137.

The first and second contact surfaces 136, 137 are shown to be flat. In other embodiments, either one or both of the first and second contact surfaces 136, 137 may be curved, in particular concave, e.g. bent (slightly) upwards at their edges, possibly with the exception of their adjacent edges. The first contact surface 136 may have a first height different from a second height of the second contact surface 137, e.g. when considered relative to the base 144. The first height and the second height have a variable height difference. In the finger scanner 130, the first contact surface 136 may be above the second contact surface 137 in the first position of the first member 132 and in the second position of the first member 132. However, in the second position the first contact surface 136 may also be aligned with the second contact surface 137.

The finger scanner 130 may comprise circuitry 150 for operating the first and second fingerprint sensors 142, 140, for communication, including Near Field Communication, NFC, with another apparatus or network, etc. The circuitry 150 may comprise a power source such as a battery, and may comprise a processing device 152 for signals and/or data, and a memory 154.

Figure 3G:
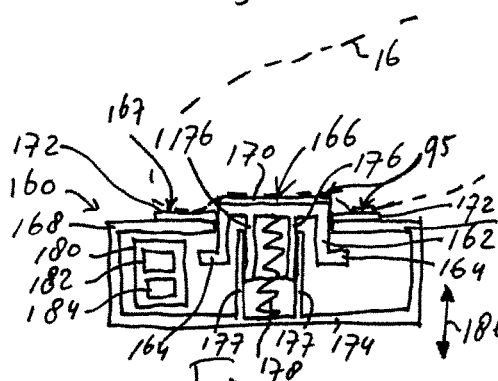
FIG. 3g depicts a cross-sectional view of a schematically represented sixth embodiment of a finger scanner according to the present invention, showing a first member in a second position thereof.
Figure 3H:
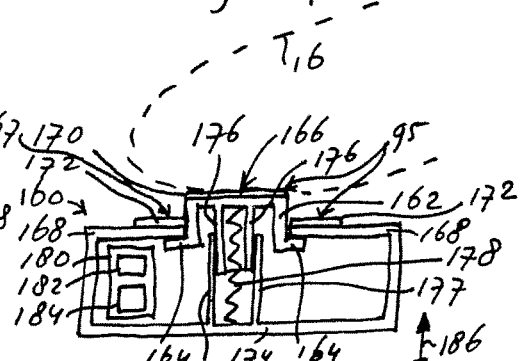
FIG. 3h depicts a cross-sectional view of the embodiment of FIG. 3g, showing the first member in a first position thereof.

FIGS. 3g and 3h show cross-sectional views of a finger scanner 160, which may have a top view similar to FIG. 2b. The finger scanner 160 comprises a first member 162 which is movable relative to a second member 168 between a first position, as shown in FIG. 3h, in which a first contact surface 166 of the first member 162 is above a second contact surface 167 of the second member 168, and a second position, as shown in FIG. 3g, in which the first contact surface 166 has been displaced relative to the first position, in particular towards the second contact surface 167. Between a base 174 of finger scanner 160 and the first member 162, a biasing member is provided, the biasing member being embodied here as a compression spring 178 configured to exert a force on a first part of a finger 16 through the first contact surface 166 of the first member 162 directed from the second position towards the first position thereof. The compression spring 178 is made from a flexible resilient material, such as metal or plastic.

The first member 162 is movable, as indicated by double arrow 186, from its first position in a direction of its second position by pressing the first member 162 towards the second member 168 against the force of the compression spring 178.

The embodiment of the finger scanner 160 shown in FIGS. 3g, 3h comprises a ball point pen type mechanism having a first mechanism part 176 connected to the first member 162 and protruding towards the base 174, and a second mechanism part 177 connected to the base 174 and protruding towards the first member 162. The ball point pen type mechanism defines the first position and the second position of the first member 162 as stable positions. The first position is further defined by collar 164. During transition from the first position (FIG. 3h) to the second position (FIG. 3g), the compression spring exerts a force on a first part of the finger 16 through the first contact surface 166 of the first member 162 directed from the second position towards the first position thereof. Such force is compensated and reduced to zero by the ball point pen type mechanism in the first and second positions of the first member 162.

The first member 162, with the first contact surface 166, has a first fingerprint sensor 170 associated with it. In FIGS. 3g, 3h, the first fingerprint sensor 170 is situated at or near the first contact surface 166. The first fingerprint sensor 170 is configured to scan a first part (of a surface) of the finger 16 contacting the first contact surface 166.

The second member 168, with the second contact surface 167, has a second fingerprint sensor 172 associated with it. In FIGS. 3g, 3h, the second fingerprint sensor 172 is situated at or near the second contact surface 167. The second fingerprint sensor 172 is configured to scan a second part (of a surface) of the finger 16 contacting the second contact surface 167.

The first and second contact surfaces 166, 167 are shown to be flat. In other embodiments, either one or both of the first and second contact surfaces 166, 167 may be curved, in particular concave, e.g. bent (slightly) upwards at their edges, possibly with the exception of their adjacent edges. The first contact surface 166 may have a first height different from a second height of the second contact surface 167, e.g. when considered relative to the base 174. The first height and the second height have a variable height difference. In the finger scanner 160, the first contact surface 166 may be above the second contact surface 167 in the first position of the first member 162 and in the second position of the first member 162. However, in the second position the first contact surface 166 may also be aligned with the second contact surface 167.

The finger scanner 160 may comprise circuitry 180 for operating the first and second fingerprint sensors 170, 172, for communication, including Near Field Communication, NFC, with another apparatus or network, etc. The circuitry 180 may comprise a power source such as a battery, and may comprise a processing device 182 for signals and/or data, and a memory 184.

Any of the finger scanners 100, 130, 160 may further comprise a force sensor for measuring a force exerted on the first contact surface, as discussed above by reference to FIG. 1a. Furthermore, any of the finger scanners 100, 130, 160 may further comprise a position detector for detecting a position of the first member as discussed above by reference to FIGS. 3a, 3b.

In the embodiment of FIGS. 1a, 1b, the first member 4 is situated next to, and adjacent to the second member 6 along a line 5 as indicated in FIG. 1b. A contact area between a finger 16 and the finger scanner 2 is indicated by a dash-dotted line 7, and overlaps part of the first contact surface 12 and part of the second contact surface 18. In the embodiments of FIGS. 2a, 2b, and 3a, 3b, and 3c, 3d, and 3e, 3f, and 3g, 3h, the second member 34, 64, 102, 138, 168 surrounds the first member 32, 62, 106, 132, 162 and the second contact surface 46, 68, 105, 137, 167 surrounds the first member 32, 62, 106, 132, 162 and, as seen from above in FIG. 2b, surrounds the first contact surface 40, 66, 104, 136, 166, along a closed-loop line 9 as indicated in FIG. 2b, the closed-loop line 9 representing the peripheral edge of first member 32, 62, 106, 132, 162. A contact area between a finger 16 and the finger scanner 30, 60, 100, 130, 160 is indicated by a dash-dotted line 11, and overlaps the full first contact surface 40, 66, 104, 136, 166 and part of the second contact surface 46, 68, 105, 137, 167.

In the embodiments of FIGS. 1a, 1b, 2a, 2b, 3a, 3b, 3c, 3d, 3e, 3f, 3g, 3h, a skin resistance sensor 95 may be associated to the first contact surface 12, 40, 66, 104, 136, 166 and/or the second contact surface 18, 46, 68, 105, 137, 167. Sensing the (electrical) resistance of the contact area between a finger 16 and the finger scanner 2, 30, 60, 100, 130, 160 provides information based on which a data processing device can determine a probability that the indeed a human finger is presented to the finger scanner 2, 30, 60, 100, 130, 160, or not.

Figure 4:
FIG. 4 depicts a fingerprint, indicating positions of deformed finger skin.

FIG. 4 shows a fingerprint image 400 as obtained with a fingerprint scanner 30, 60, 100, 130, or 160. As illustrated in FIGS. 1a, 2a, 3b, 3d, 3f, 3g, skin of a finger 16 is deformed as a result of differences in pressure exerted on different parts of a finger by a first member 4, 32, 62, 106, 132, 162 and a second member 6, 34, 64, 102, 138, 168. In particular, with the embodiments shown in FIGS. 1a, 1b, 2a, 2b, 3a, 3b, 3c, 3d, 3e, 3f, 3g, 3h, a pressure exerted through first contact surface 12, 40, 66, 104, 136, 166 is higher than a pressure exerted by second contact surface 18, 46, 68, 105, 137, 167, at least (for the embodiments of FIGS. 3a, 3b, 3c, 3d, 3e, 3f, 3g, 3h) during displacement of the first member 62, 106, 132, 162 from the first position to the second position thereof. These pressure differences cause the skin of the finger 16 to be tensioned more in some parts thereof, and to deform at locations contacting, or being in, a transitional region between first contact surface 12, 40, 66, 104, 136, 166 and second contact surface 18, 46, 68, 105, 137, 167. This can be observed in an image of the fingerprint taken as a combination of images captured by first fingerprint sensor 14, 42, 78, 108, 142, 170 and second fingerprint sensor 20, 48, 80, 110, 140, 172. Locations of deformation brought about by the finger scanner embodiments of FIGS. 2a, 2b, 3a, 3b, 3c, 3d, 3e, 3f, 3g, 3h are indicated in FIG. 4 by dots, and broadly follow the edge of the first contact surface 40, 66, 104, 136, 166.

In order to be able to capture the intended deformation of the finger skin, a distance between an edge of the first contact surface 12, 40, 66, 104, 136, 166 and an edge of the second contact surface 18, 46, 68, 105, 137, 167 is at least 0.1 mm, in particular at least 0.5 mm, more in particular at least 1 mm.

Figure 5A:
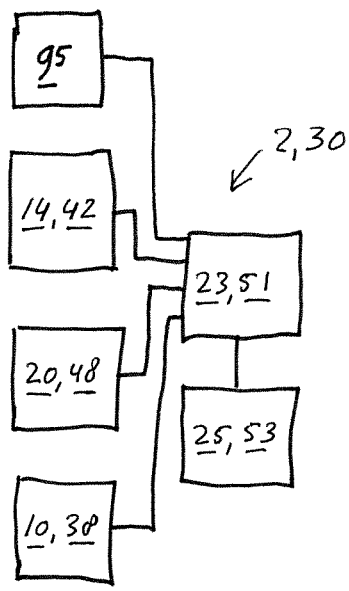
FIG. 5a depicts a block diagram of a finger scanner in an embodiment of FIGS. 1a, 1b, 2a, 2b.

FIG. 5a shows a block diagram of an embodiment of a finger scanner 2, 30. The finger scanner 2, 30 comprises first fingerprint sensor 14, 42, second fingerprint sensor 20, 48, optional force sensor 10, 38, optional skin resistance sensor 95, and memory 25, 53 connected to processing device 23, 51. An operation of these components is discussed below by reference to FIG. 6.

Figure 5B:
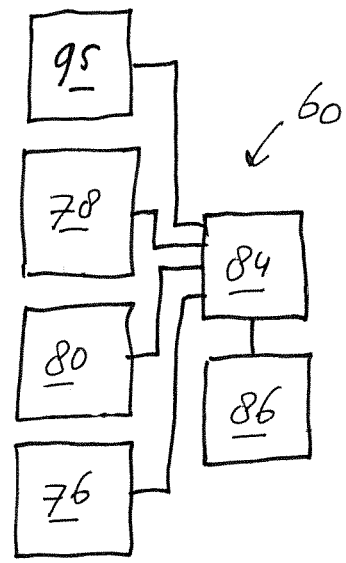
FIG. 5b depicts a block diagram of a finger scanner in an embodiment of FIGS. 3a, 3b.

FIG. 5b shows a block diagram of an embodiment of a finger scanner 60. The finger scanner 60 comprises first fingerprint sensor 78, second fingerprint sensor 80, optional position detector 76, optional skin resistance sensor 95, and memory 86 connected to processing device 84. An operation of these components is discussed below by reference to FIG. 7.

Figure 5C:
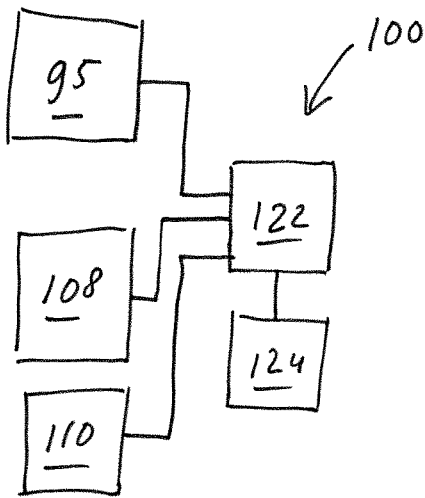
FIG. 5c depicts a block diagram of a finger scanner in an embodiment of FIGS. 3c, 3d.

FIG. 5c shows a block diagram of an embodiment of a finger scanner 100. The finger scanner 100 comprises first fingerprint sensor 108, second fingerprint sensor 110, optional skin resistance sensor 95 and memory 124 connected to processing device 122.

Figure 5D:
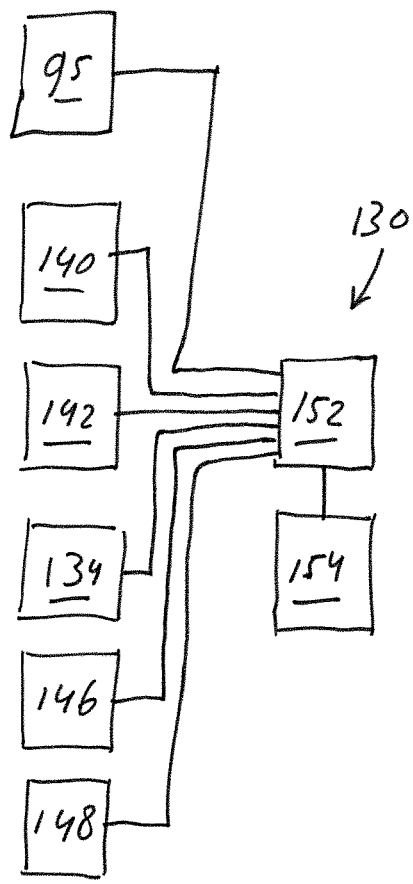
FIG. 5d depicts a block diagram of a finger scanner in an embodiment of FIGS. 3e, 3f.

FIG. 5d shows a block diagram of an embodiment of a finger scanner 130. The finger scanner 130 comprises first fingerprint sensor 142, second fingerprint sensor 140, electrically conducting lower parts 134, electrically conducting stop member 146, electrical coil 148, optional skin resistance sensor 95 and memory 154 connected to processing device 152.

Figure 5E:
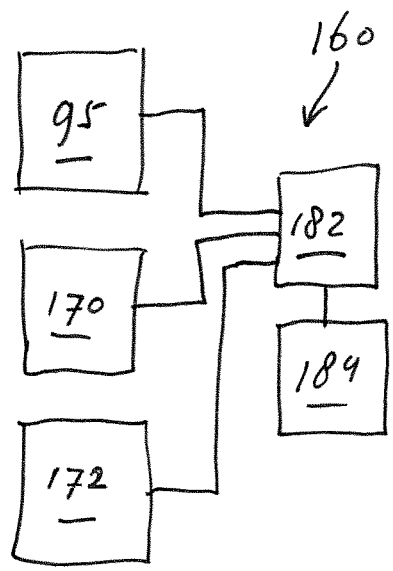
FIG. 5e depicts a block diagram of a finger scanner in an embodiment of FIGS. 3g, 3h.

FIG. 5e shows a block diagram of an embodiment of a finger scanner 160. The finger scanner 160 comprises first fingerprint sensor 170, second fingerprint sensor 172, optional skin resistance sensor 95 and memory 184 connected to processing device 182.

Figure 6:
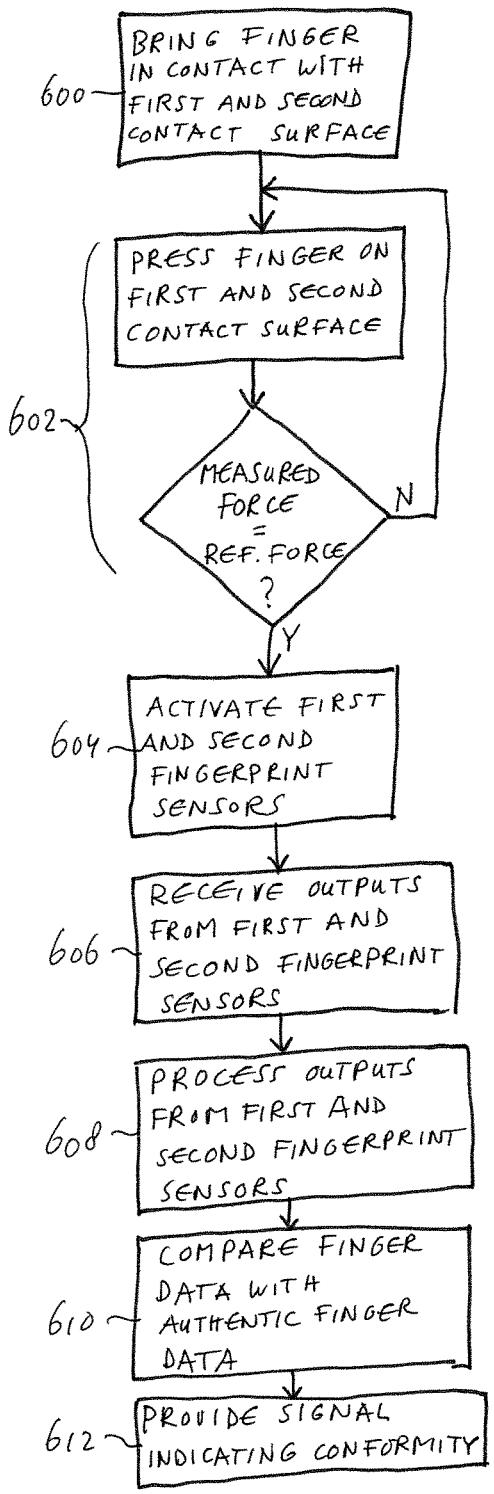
FIG. 6 depicts a flow diagram of a finger scanning process using an embodiment of a finger scanner of the type illustrated by FIGS. 1a, 1b, 2a and 2b.

An operation of the finger scanner 2 shown in FIGS. 1a, 1b or the finger scanner 30 shown in FIGS. 2a, 2b is illustrated by the flow diagram of FIG. 6.

In a step 600, the finger 16 contacts the first contact surface 12, 40 and the second contact surface 18, 46 of the finger scanner 2, 30.

In a step 602, the finger 16 presses on the first contact surface 12, 40 and the second contact surface 18, 46 until a force measured by the force sensor 10, 38 corresponds to a reference force. An output of the force sensor 10, 38 may be received by the processing device 23, 51 or another processing device, which compares the force measured by the force sensor 10, 38 to the reference force. Data relating to the reference force may be stored in memory 25, 53 or in another memory.

In a step 604, when the force measured by the force sensor 10, 38 corresponds to the reference force, as determined by the processing device 23, 51 or another processing device, the first fingerprint sensor 14, 42 and the second fingerprint sensor 20, 48 are or have been activated by the processing device 23, 51 or another processing device to provide respective outputs, each representing an image of part of a fingerprint.

In a step 606, the outputs are received from the first fingerprint sensor 14, 42 and the second fingerprint sensor 20, 48 by the processing device 23, 51 or another processing device.

In a step 608, these outputs are processed by the processing device 23, 51 or another processing device to determine finger data representative of the contact area 7, 11 between the finger 16 and the finger scanner 2, 30 on the first contact surface 12, 40 and the second contact surface 18, 46.

In a step 610, the finger data are compared with previously stored authentic finger data by the data processing device 23, 51 or another processing device. The authentic finger data may be stored in the memory 25, 53 or another memory.

In a step 612, a signal is provided, the signal indicating a degree of conformity between the finger data and the previously stored authentic finger data, based on said comparing of the finger data with previously stored authentic finger data. The signal may be provided by the processing device 23, 51 or another processing device. The signal may be used in an application, e.g. an identification or access control application, where obtaining and checking a fingerprint of a person is required, and the signal may lead to acceptance or rejection of the fingerprint.

Figure 7:
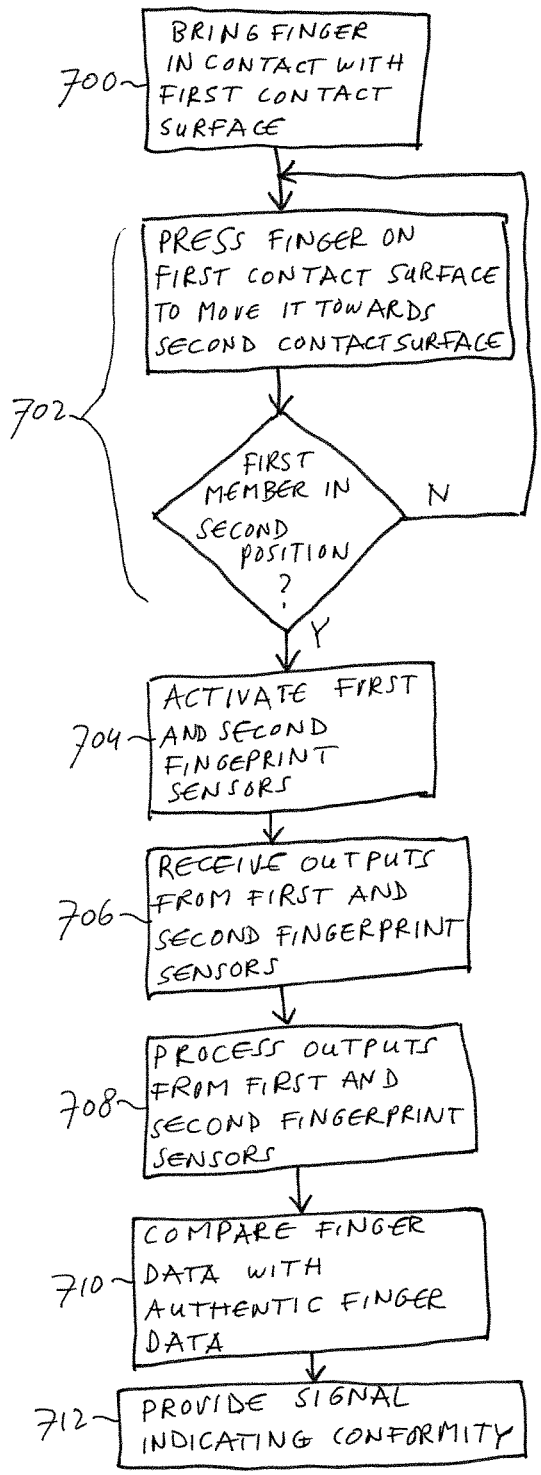
FIG. 7 depicts a flow diagram of a finger scanning process using an embodiment of a finger scanner of the type illustrated by FIGS. 3a and 3b.

An operation of the finger scanner 60 shown in FIGS. 3a, 3b is illustrated by the flow diagram of FIG. 7.

In a step 700, a first part of the finger 16 contacts the first contact surface 66 of the first member 62.

In a step 702, the finger 16 presses on the first member 62 to move the first contact surface 66 towards the second contact surface 68 until a position detected by the position detector 76 corresponds to the second position of the first member 62. An output from the position detector 76 may be received by the processing device 84 or another processing device, which determines from the output whether the position detected by the position detector 76 corresponds to the second position of the first member 62.

Data relating to the second position may be stored in the memory 86 or in another memory.

In a step 704, when the position detected by the position detector 76 corresponds to the second position of the first member 62, as determined by the processing device 84 or another processing device, the first fingerprint sensor 78 and the second fingerprint sensor 80 are or have been activated by the processing device 84 or another processing device to provide respective outputs, each representing an image of part of a fingerprint.

In a step 706, the outputs are received from the first fingerprint sensor 78 and the second fingerprint sensor 80 by the processing device 84 or another processing device.

In a step 708, these outputs are processed by the processing device 84 or another processing device to determine finger data representative of the contact area 11 between the finger 16 and the finger scanner 60 on the first contact surface 66 and the second contact surface 68.

In a step 710, the finger data are compared with previously stored authentic finger data by the processing device 84 or another processing device. The authentic finger data may be stored in memory 86 or another memory.

In a step 712, a signal is provided, the signal indicating a degree of conformity between the finger data and the previously stored authentic finger data, based on said comparing of the finger data with previously stored authentic finger data. The signal may be provided by the processing device 84 or another processing device. The signal may be used in an application, e.g. an identification or access control application, where obtaining and checking a fingerprint of a person is required, and the signal may lead to acceptance or rejection of the fingerprint.

The flow diagram of FIG. 7 also applies to the finger scanner embodiment of FIGS. 3c, 3d, the finger scanner embodiment of FIGS. 3e, 3f, and the finger scanner embodiment of FIGS. 3g, 3h. However, in step 702, for the finger scanner embodiment of FIGS. 3c, 3d, 3e and 3f, the second position of the first member 106, 132 may not be detected by a position detector, as in the finger scanner embodiment of FIGS. 3a, 3b, but is defined by the first member 106, 132 contacting the stop member 114, 146. For the finger scanner embodiment of FIGS. 3e, 3f, the second position may be detected by an electric switch formed by electrically conducting lower parts 134 of first member 132 electrically contacting the electrically conducting stop member 146, thus electrically connecting the lower parts 146. For the finger scanner embodiment of FIGS. 3g, 3h, the second position is predetermined by the ball point pen type mechanism 176, 177 in step 702.

The optional skin resistance sensor 95 can be activated from step 600 or step 700 according to the flow diagrams of FIGS. 6 and 7, respectively. Preferably, skin resistance sensor 95 is activated during at least one or all of steps 600, 602, 604 (FIG. 6) or during at least one or all of steps 700, 702, 704 (FIG. 7), to further prevent fake fingerprints to be processed or accepted.

In the embodiments of FIGS. 1a, 1b, 2a, 2b, 3a, 3b, 3c, 3d, 3e, 3f, 3g and 3h, the first fingerprint sensor 14, 42, 78, 108, 142, 170 and the second fingerprint sensor 20, 48, 80, 110, 140, 172 each comprise a sensor selected from a group of sensors comprising an optical sensor, an ultrasonic sensor, and a capacitive sensor.

As explained above, a finger scanner comprises a first member and a second member. The first member has a first contact surface configured to contact a first part of a finger, and the second member has a second contact surface adjacent to the first member and configured to contact a second part of the finger adjacent to the first part of the finger. The first contact surface has a first height and the second contact surface has a second height, wherein the first height and the second height have a fixed or variable height difference. The finger scanner further comprises a first fingerprint sensor associated with the first contact surface, and a second fingerprint sensor associated with the second contact surface.

The present invention can contribute to security, secure access and/or identification such as coupling a finger image or fingerprint to a personal profile in security access management, providing secure access to devices, services, and systems.

The present invention may replace or supplement other secure access means, such as keys, passwords, NFC or RFID tokens, etc., for
- gaining or restricting access to e.g. remote or local computers, servers, tablets, mobile devices such as laptop computers or smartphones, routers, servers, printers;
- personalize settings of e.g. computer system profiles, user accounts, web services, mobile apps, computer application programs, printer settings, coffee machine settings, television settings, access management, security level management, clearance management;
- gaining or restricting access to, and use of cars, trains, planes, and other vehicles;
- opening or closing locks
- control of alarm systems, remote control systems
- enabling secure credit cards, security cards, electronic keys, ID cards or tags, tokens;
- enabling payment services;
- etc.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

A single processor or other unit may fulfil the functions of several items recited in the claims. On the other hand, different functions may be fulfilled by different processors or data processing devices.

The invention claimed is:

1. A finger scanner, comprising:
   a first member and a second member, wherein the first member has a first contact surface configured to contact a first part of a finger, and the second member has a second contact surface adjacent to the first member and configured to contact a second part of the finger adjacent to the first part of the finger, wherein the first contact surface has a first height and the second contact surface has a second height, wherein the first height and the second height have a fixed or variable height difference;
   a first fingerprint sensor associated with the first contact surface; and
   a second fingerprint sensor associated with the second contact surface.

2. The finger scanner of claim 1, wherein the first member is fixed to the second member.

3. The finger scanner according to claim 1,
   wherein the first member is movable relative to the second member between a first position in which the first contact surface is above the second contact surface, and a second position in which the first contact surface has been displaced relative to the first position; and wherein the finger scanner further comprises:
   a biasing assembly configured to exert a force on the first part of the finger through the first contact surface of the first member during displacement of the first member from the first position to the second position thereof, the force being directed from the second position towards the first position thereof.

4. The finger scanner according to claim 3, wherein the biasing assembly comprises a spring member.

5. The finger scanner according to claim 3, wherein the biasing assembly comprises a stop member limiting the displacement of the first member from the first position to the second position thereof.

6. The finger scanner according to claim 3, wherein the biasing assembly is configured to substantially lower the force when the first member is in the second position thereof.

7. The finger scanner according to claim 6, wherein the biasing assembly comprises a bladder made from a flexible resilient material, an interior volume of the bladder being in fluid communication with the an exterior of the bladder through an opening having a predetermined flow resistance.

8. The finger scanner according to claim 6, wherein the biasing assembly comprises a first magnet part connected to the first member, and a second magnet part connected to the second member, at least one of the first magnet part and the second magnet part being energizable and de-energizable to hold and release the first member in position relative to the second member, respectively.

9. The finger scanner according to claim 6, wherein the biasing assembly comprises a ball point pen type mechanism holding the first member in at least one of the first position or the second position thereof.

10. The finger scanner according to claim 1, further comprising:
    a force sensor for measuring a force exerted on at least one of the first contact surface and the second contact surface.

11. The finger scanner according to claim 3, further comprising:
    a position detector for detecting a position of the first member.

12. The finger scanner according to claim 1, wherein at least one of the first contact surface and the second contact surface is provided with a skin resistance sensor.

13. The finger scanner according to claim 1, wherein a distance between an edge of the first contact surface and an edge of the second contact surface is at least 0.1 mm.

14. The finger scanner according to claim 1, wherein the second contact surface at least partially surrounds the first member.

15. The finger scanner according to claim 1, wherein at least one of the first contact surface and the second contact surface is shaped concavely.

16. The finger scanner according to claim 10, further comprising a processing device configured to:
    receive an output from the force sensor, the output from the force sensor representing a force measured by the force sensor;
    compare the force measured by the force sensor to a reference force; and
    if the measured force corresponds to the reference force, then activate the first fingerprint sensor and the second fingerprint sensor to provide respective outputs, the outputs from the first fingerprint sensor and the second fingerprint sensor representing fingerprint data.

17. The finger scanner according to claim 11, further comprising a processing device configured to:
    receive an output from the position detector, the output from the position detector representing a position of the first member;
    determine from the output whether the position detected by the position detector corresponds to the second position of the first member; and
    if the detected position corresponds to the second position, then activate the first fingerprint sensor and the second fingerprint sensor to provide respective outputs, the outputs from the first fingerprint sensor and the second fingerprint sensor representing fingerprint data.

18. The finger scanner according to claim 16, wherein the processing device further is configured to:
    receive the outputs from the first fingerprint sensor and the second fingerprint sensor; and
    process the outputs to determine finger data representative of the finger surface in contact with the first contact surface and the second contact surface.

19. The finger scanner according to claim 18, wherein the processing device further is configured to:
    compare the finger data with previously stored authentic finger data; and
    provide a signal indicating a degree of conformity between the finger data and the previously stored authentic finger data.

20. The finger scanner according to claim 1, wherein the first fingerprint sensor and the second fingerprint sensor each comprise a sensor selected from a group of sensors comprising an optical sensor, an ultrasonic sensor, and a capacitive sensor.

21. An identification device comprising the finger scanner according to claim 1.

22. An access control device comprising the finger scanner according to claim 1.

23. A method of scanning a finger, the method comprising the steps of:
- providing a finger scanner according to claim 10;
- contacting the first contact surface and the second contact surface by the finger;
- pressing by the finger on the first contact surface and the second contact surface until a force measured by the force sensor corresponds to a reference force; and
- activating the first fingerprint sensor and the second fingerprint sensor.

24. A method of scanning a finger, the method comprising the steps of:
- providing a finger scanner according to claim 3;
- contacting a first part of the finger with the first contact surface of the first member in the first position thereof;
- pressing by the finger on the first member to move the first contact surface towards the second contact surface until the first member is in the second position thereof; and
- activating the first fingerprint sensor and the second fingerprint sensor.

25. The method according to claim 23, further comprising:
- receiving outputs from the first fingerprint sensor and the second fingerprint sensor; and
- processing the outputs to determine finger data representative of the finger surface in contact with the first contact surface and the second contact surface.

26. The method according to claim 25, further comprising:
- comparing the finger data with previously stored authentic finger data; and
- providing a signal indicating a degree of conformity between the finger data and the previously stored authentic finger data.

* * * * *